Jan. 25, 1927.
J. STERN
1,615,244
FLOATING SOAP
Filed April 15, 1924
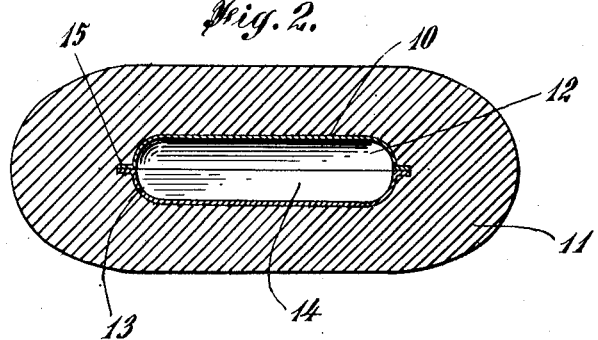
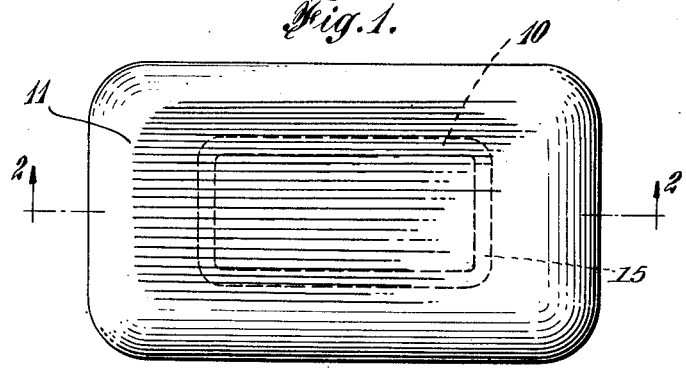
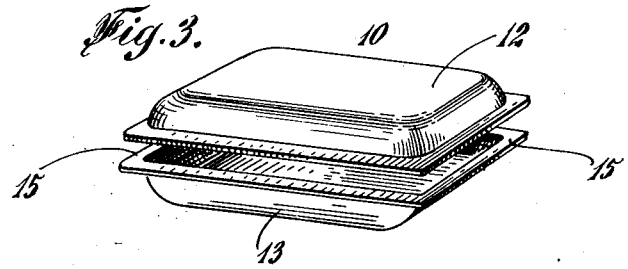
INVENTOR
Julius Stern
BY Conrad A. Dietrich
his ATTORNEY Patented Jan. 25, 1927.

1,615,244

UNITED STATES PATENT OFFICE.

JULIUS STERN, OF BROOKLYN, NEW YORK.

FLOATING SOAP.

Application filed April 15, 1924. Serial No. 706,642.

My invention relates to improvements in floating soap and the same has for its object more particularly to provide an article of manufacture which is of a simple, efficient and economical construction adapted to float on water and which is particularly of value when embodied in soaps, for instance, laundry soaps of a composition heavier than water.

Further, said invention has for its object to provide an article as above specified inclosed in which is a float which occupies a relatively small portion thereof.

Further said invention has for its object to provide an article as above specified which is rendered sufficiently buoyant to float by the provision of a thin, hollow float embedded therein.

Further, said invention has for its object to provide an article as above specified which is rendered sufficiently buoyant to float by the provision of an air chamber therein formed by a thin, stiff, hollow member having a volume of the order of magnitude approximating one tenth of the volume of the article.

Other objects will in part be obvious and in part be pointed out hereinafter.

To the attainment of the aforesaid objects and ends my invention consists in the novel details of construction and in the combination, connection and arrangement of parts hereinafter more fully described and then pointed out in the claim.

In the accompanying drawing,

Figure 1 is a plan or top view showing one form of article or manufacture constructed according to, and embodying my said invention;

Fig. 2 is a longitudinal section on the line 2—2 of Fig. 1; and

Fig. 3 is a perspective view of the hollow member or shell employed therein, the same being shown with the parts thereof separated.

In said drawing, the hollow member or shell 10 constituting a hollow float is embedded centrally within the plastic body 11 composed of any of the substances employed for soap, which are usually of densities greater than that of water.

The float 10 is of a size or volume to inclose enough air to render the article sufficiently buoyant to float on water and preferably consists of the parts 12 and 13 shaped to inclose the air chamber 14 and secured together at the flanges 15 thereof in any suitable manner as by an adhesive or by crimping.

The float 10 is composed preferably of a suitable thin light material such as waxed paper, of sufficient stiffness to permit, when properly shaped and assembled, of the manufacture and use of the article and of the maintenance of the float 10 in operative condition.

The article is manufactured by first assembling and securing the parts 12 and 13 of the member 10 together and then embedding the same in the plastic body 11 by placing said member 10 in a mold and surrounding the same therein with the plastic mass in a more or less liquid condition, which thereupon sets or hardens.

The article thus formed irrespective of the density of the material employed for the plastic mass or soap is sufficiently light or buoyant to float on water.

The parts 12 and 13 being of a concave or arched construction and being inherently stiff are sufficiently rigid when assembled to maintain the air chamber or space 14 therebetween, not only during the manufacture of the article but also during its use or consumption.

By utilizing a thin, stiff, hollow member or shell for the float 10 the article constructed according to my said invention, although floatable, is of a size convenient to handle.

Furthermore, although the float 10 is sufficiently large to render the article floatable, yet the same displaces centrally of the plastic body, a relatively small volume of the plastic material. Hence, there is virtually no loss of material in soaps embodying my said invention. In cakes of soap heretofore in use the final central portions thereof (displaced in my said invention by said float 10) are seldom utilized, the same being then too thin for use and crumbling easily.

For example, when my said invention is embodied in soaps of specific weights of 1.05 to 1.15 compared to water, the float 10 should have a volume of the order of magnitude approximating one tenth of the volume of the article, (more or less depending, of course, on the specific weight of the material employed for the plastic body or soap) and should be sufficiently large to render the article floatable. In my said invention the float 10 displaces about one tenth of the plastic mass when employed in a cake of standard size, but, as explained above, in cakes not employing my said invention this portion of the soap is seldom utilized.

Having thus described my said invention, what I claim and desire to secure by Letters Patent is:

An article of the character described comprising a body of soap, and a hollow buoyant member embedded therein; said member including a pair of registering parts of thin stiff material having laterally projecting flanges extending around the peripheries thereof in contact with each other and serving to secure said parts together; said member inclosing substantially the minimum volume necessary to render said article sufficiently bouyant to float, substantially as specified.

Signed at the city of New York, county of New York and State of New York, this 26th day of February, one thousand nine hundred and twenty-four.

JULIUS STERN.